United States Patent
Detrick

(12) 
(10) Patent No.: US 10,997,619 B2
(45) Date of Patent: May 4, 2021

(54) FLEX SERVICE CAR WASH

(71) Applicant: Innovative Control Systems, Inc., Wind Gap, PA (US)

(72) Inventor: Kevin Detrick, Nazareth, PA (US)

(73) Assignee: Innovative Control Systems, Inc., Wind Gap, PA (US)

(*) Notice: Subject to any disclaimer, the term of this patent is extended or adjusted under 35 U.S.C. 154(b) by 90 days.

(21) Appl. No.: 16/219,344

(22) Filed: Dec. 13, 2018

(65) Prior Publication Data

US 2019/0114657 A1 Apr. 18, 2019

Related U.S. Application Data

(63) Continuation of application No. 14/267,465, filed on May 1, 2014.

(60) Provisional application No. 61/818,194, filed on May 1, 2013.

(51) Int. Cl.
*G06Q 30/02* (2012.01)
*G06Q 10/06* (2012.01)

(52) U.S. Cl.
CPC ... *G06Q 30/0207* (2013.01); *G06Q 10/06311* (2013.01)

(58) Field of Classification Search
CPC .............. G06Q 30/0207; G06Q 10/06311
USPC ....................................... 705/14.1
See application file for complete search history.

(56) References Cited

U.S. PATENT DOCUMENTS

| | | | |
|---|---|---|---|
| 6,366,220 B1* | 4/2002 | Elliott | G06Q 10/087 340/10.1 |
| 7,778,937 B2 | 8/2010 | Ferrera et al. | |
| 8,284,924 B2 | 10/2012 | Dube et al. | |
| 8,443,301 B1* | 5/2013 | Easterly | G01M 17/007 715/848 |
| 8,589,819 B2* | 11/2013 | Allen | G06Q 30/0281 715/810 |
| 2003/0233153 A1 | 12/2003 | Grier | |
| 2006/0144430 A1* | 7/2006 | Ringdahl | G07F 17/20 134/123 |

(Continued)

FOREIGN PATENT DOCUMENTS

WO WO 01/75812 * 10/2001

OTHER PUBLICATIONS

"Requirements and Design for Voucher Trading System" Authors: K. Fujimura and D. Eastlake (Year: 2003).*

(Continued)

*Primary Examiner* — Victoria E Frunzi
(74) *Attorney, Agent, or Firm* — Troutman Pepper Hamilton Sanders LLP

(57) ABSTRACT

A system and method of operating a carwash with flexible service offerings comprises providing an automated computer terminal at which a user of a vehicle can purchase a car wash and at least one additional service, such as a hand service, after receiving the car wash, determining a queue for the at least one additional service at the time a user purchases a car wash, calculating a price for the at least one additional service based on the queue and displaying the price for the at least one additional service on the automated computer terminal. If the queue for the at least one additional service is low or empty, the user is provided with a discount to incentivize the user to purchase such service.

20 Claims, 2 Drawing Sheets

(56) References Cited

U.S. PATENT DOCUMENTS

| | | | | |
|---|---|---|---|---|
| 2009/0076875 A1* | 3/2009 | Lert, Jr. | ............... | G06Q 30/02 |
| | | | | 705/14.3 |
| 2011/0196732 A1* | 8/2011 | Schueller | ........... | G06Q 20/3255 |
| | | | | 705/14.33 |
| 2014/0058841 A1* | 2/2014 | Getchius | ............... | G06Q 30/02 |
| | | | | 705/14.58 |
| 2014/0249866 A1* | 9/2014 | Popkey | ................ | G07B 15/00 |
| | | | | 705/5 |
| 2016/0196597 A1 | 7/2016 | Allen | | |

OTHER PUBLICATIONS

Non-Final Office Action dated Apr. 4, 2020 in corresponding U.S. Appl. No. 14/267,465.
Final Office Action dated Nov. 10, 2020 in corresponding U.S. Appl. No. 14/267,465.

* cited by examiner

FLEX SERVICE CAR WASH

CROSS-REFERENCE TO RELATED APPLICATION APPLICATIONS

This present application is a continuation of U.S. patent application Ser. No. 14/267,465, filed May 1, 2014, which claims the benefit of priority of U.S. Provisional Patent Application Ser. No. 61/818,194, filed May 1, 2013, the entire contents of each of which is incorporated by reference herein.

FIELD OF THE INVENTION

The present invention relates to car wash services generally, and more particularly to, in one embodiment, car wash services with an option to receive hand services to finish the wash.

BACKGROUND

A typical flex serve carwash, or a carwash with flexible service offerings includes an automated (i.e. conveyor) exterior wash and non-automated hand-finishing services that may include, for example, a towel dry, tire shine, bug removal, vacuuming and/or shampooing carpets, washing the interior windows, and/or hand waxing the exterior. Services provided by such carwashes provide consumer options ranging from low priced to high priced services and chores. A flex serve carwash customer typically arrives at an entry gate of the carwash where the customer is greeted by an automated payment terminal that recommends carwash services to them. The customer has a choice of purchasing an automated exterior wash only, or adding additional services such as hand services to finish the wash. After finalizing the transaction, a wash detail ticket may be generated and dispensed to the customer, listing the services purchased. The gate is lifted and the customer enters a carwash tunnel.

The customer remains in their vehicle as a conveyor pushes or pulls the car through the carwash tunnel to complete the selected exterior automated wash. After exiting the carwash tunnel, the customer can either end the carwash process by exiting the carwash with his vehicle or the customer can enter a queue for the hand-finishing services if they have purchased additional services at the time they purchased the exterior automated wash (e.g., at the automated payment terminal). After entering the queue for hand-finishing services, the customer will pull the vehicle into a finishing area where they will get out of the vehicle, and wait in a lobby area until the car wash employees have completed the services that were purchased.

Hand-finishing services usually take up to seven minutes to complete per vehicle, while exterior automated washes may take less time per vehicle, either by virtue of a shorter car wash process or simultaneous treatment of multiple vehicles. Therefore, a line for the hand-finishing services can build up behind the carwash tunnel that the customers cannot anticipate before purchasing services. In order to redeem the hand-finishing services previously purchased, the customer is asked to give the attendant the wash ticket receipt received at the automated terminal. This wash ticket is typically the only tracking device for the purchased service since personnel in the hand finish services area typically do not have easily accessible computers. After the hand-finishing services are completed, the customer exits the carwash.

One problem with a typical flex service carwash arrangement like that described above is that the wait time for the customer once the customer exits the exterior wash is usually not known at the time the customer purchases the exterior wash. For example, if many customers have purchased hand-finishing services at the automated terminal, the queue for hand-finishing services and the corresponding wait time can back up rapidly without the customer being aware. In a typical operation, the hand finish services queue can accommodate approximately five or six cars, and if each car takes approximately seven minutes to complete, the wait time can be excessive. If the wait time is longer than thirty minutes, for example, the backup may then encroach upon the carwash tunnel causing a backup on the conveyor for the carwashes where the cars and customers are at a standstill inside the tunnel.

Another problem with a typical flex service arrangement is the inability to control cash effectively. If a customer arrives at the hand-finishing service station and claims that they do not have the ticket for services they claimed to have purchased, it takes time for the hand-finishing employees to go to a computer terminal in the carwash tunnel to research and verify services purchased. The extra wait time may frustrate the workflow of the employees, upsets the customer receiving services, and may irritate customers waiting for hand-finishing services. More often than not, the employee provides a service that may not have been purchased at the automated terminal in order to avoid further upsetting the customer and extending the wait time for the other customers. If the employee provides a service that is not paid for by the customer, both the car wash and the employee will lose revenue. Since hand-finishing service employee commissions are usually based on sales registered in the computer, if a customer does not have his ticket and claims he or she purchased the hand finish services at the automated teller, the employee, for lack of time and due to a desire to please the customer, performs the hand finish services, but there is no record of it in the computer system which generates their commission. Also, the hand-finishing service provided will not enter the books of the employer, resulting in reduced sales. Furthermore, if multiple crews work on vehicles, commissions are usually split evenly between crews regardless of how many vehicles each crew washed or regardless of the amount of services performed, which further dilutes the employee commission pool if services are being performed that are not paid for by the customer.

SUMMARY

In one embodiment, a system and method of operating a flex service carwash comprises providing an automated terminal at which a vehicle customer can purchase an exterior car wash and at least one additional service, such as a hand-finishing service, to be provided after receiving the car wash, determining a queue for the at least one additional service at the time a customer purchases a car wash, calculating a price for the at least one additional service based on the queue and displaying the price and wait time for the at least one additional service on the automated terminal. If the queue for the at least one additional service, such as a hand-finishing service, is low or empty, this is communicated to the customer and the customer may be provided with a discount to incentivize the customer to purchase such additional service. If the queue for the at least one additional service is long, resulting in long wait times that could also back up the exterior wash service, this is also communicated to the customer at the time the customer decides to purchase the exterior wash, and the customer can choose whether to purchase the at least one additional service and be subject to the long queue. In one embodiment where a queue is long, the customer would not be offered a discount. Also provided is a system and method for capturing information about the customer's purchases and communicating the same to the car wash employees providing hand finishing services.

DETAILED DESCRIPTION OF THE PREFERRED EMBODIMENTS

Figure 1:
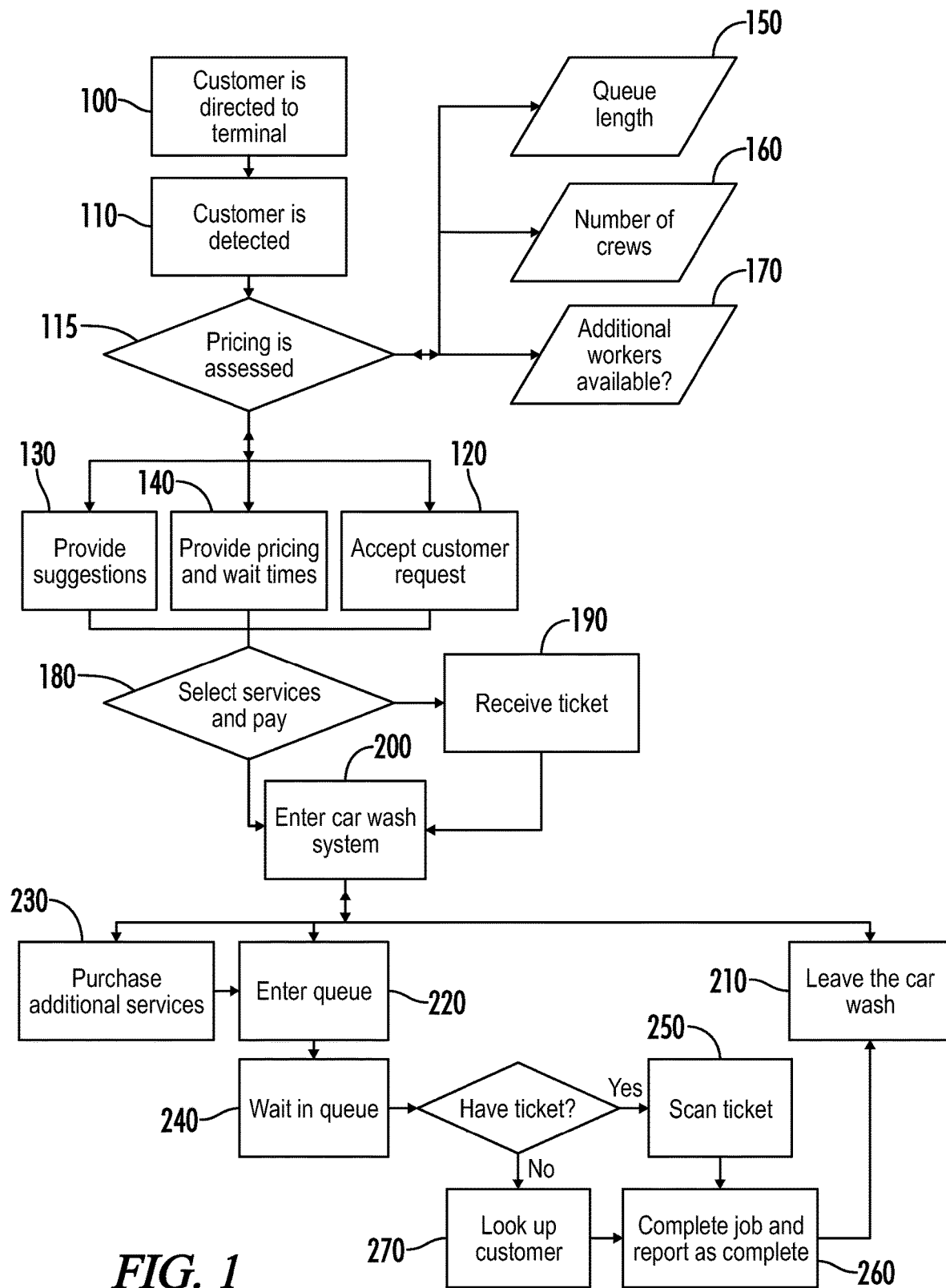
FIG. 1 is a flowchart illustrating one embodiment of a method of operating a flex service carwash in accordance with the present disclosure.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

The disclosure describes, generally, an embodiment of a method and system for providing carwash services wherein a customer is offered or requests a set of services including a car wash and at least one additional service, such as a hand-finishing service. In pricing and offering additional services, the method and system may take into account an already existing queue for services by providing discounted or increased prices based on the length of the queue to incentivize or disincentivize the purchasing of such additional services. In some embodiments, the system may provide additional tools to manage the flow of customers through the method provided as well as distribute information to various parties involved in the workflow.

Figure 2:
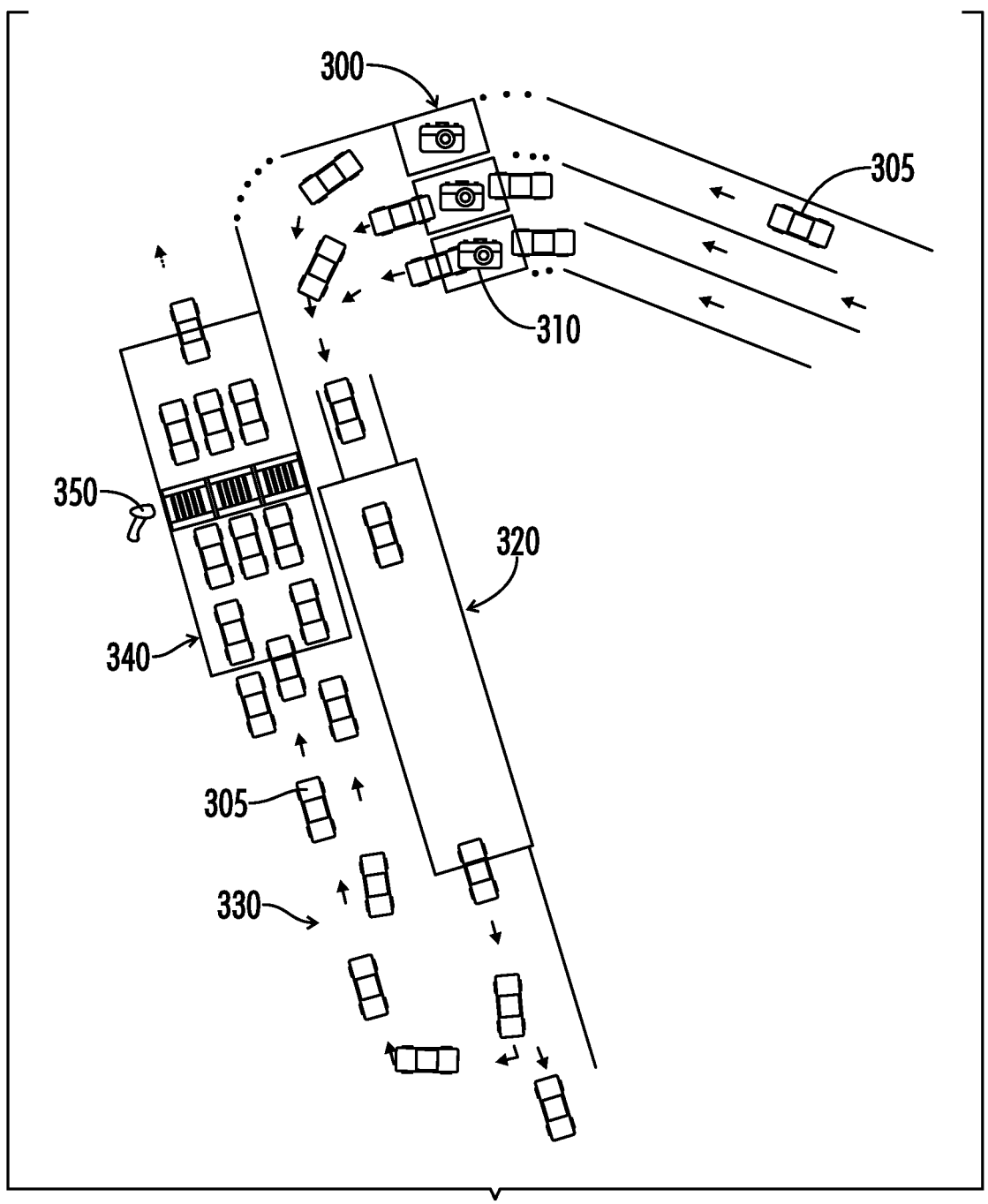
FIG. 2 is a diagram illustrating one embodiment of a flex service car wash system in accordance with the present disclosure.

FIG. 1 is a flowchart illustrating one embodiment of a method of operating a flex service carwash in accordance with the present disclosure. FIG. 2 is a diagram illustrating one embodiment of a flex service car wash system in accordance with the present disclosure. The method of FIG. 1 may be applied, for example, in the system diagramed in FIG. 2. Other methods and systems may be used without departing from the scope of the invention.

As shown in FIGS. 1 and 2, a customer in a vehicle 305 (FIG. 2) is first directed (100) to an automated terminal 300 at which the customer can purchase services, such as car washing and/or hand finishing services. The terminal 300 can be automated (i.e. not attended) or attended by a customer service representative, or the terminal 300 can be both automated and then attended if additional help is required. The customer may then be detected (110) using, for example, a magnetic loop, ultrasonic sensor, camera or an electronic eye 310 that activates the terminal's greeting. The terminal 300 may be configured to provide information and allow a customer to purchase a standard car wash along with additional services, such as hand-finishing services including, for example, towel dry, tire shine, bug removal, interior vacuuming, interior window cleaning, and waxing, among others.

The terminal 300 may then assess a set of factors (115) and display or otherwise suggest a set of services (130) and/or provide a list of services paired with current pricing (140), which may be provided with associated wait times. In some embodiments, a user may also request a specific service (120). The suggestions (130) and the pricing (140) displayed or provided by the terminal 300, as well as any pricing associated with specific services requested (at 120) may be based on several factors assessed in relation to a specified time. Those factors may include, for example, a current wait time based on a queue length for specified services 150 and/or the number of crews handling services at the current time 160. Typically, the amount of time required for any service selected by a customer is known when a service is purchased, and the amount of time required for a task can therefore be included in queue length calculations. The calculation may further include, in some embodiments, the availability of additional workers to assist with a specified service 170, among other factors. These factors may be assessed when the customer arrives at the terminal 300, and the suggestions 130 or pricing 140 provided may be based on expected wait times for the services. In one example, if a wait time is low due to a low number of people queued for hand-finishing services generally or for specified services which may take varying but predictable times, services may be discounted to encourage and incentivize customers to enter the queue, in order to purchase and use excess labor capacity not being utilized. In one example, the wait time may be predetermined and calculated by a certain time, such as fifteen minutes or less, or by a certain number of vehicles in the queue, such as two or fewer vehicles, or no vehicles in the queue as the case may be. If, on the other hand, waiting periods are long due to a full queue or a smaller number of teams working at the time, finishing services may be full price, or a price may be increased accordingly. Prices may be determined based on an algorithm, or they may be looked up in a table outlining expected variations in a set of variables. A customer may also be informed of the current estimated wait time to allow the customer to determine whether they should purchase the additional service. Providing a customer with a wait time also further enhances the customer experience, and allows the customers to assess performance of the car wash against a reasonable expectation of that performance.

In some embodiments, customers may be offered a premium option to, for example, bypass the queue by paying an increased price or by reserving a future time at which to receive the services. Customers may also be provided with suggested times to return when there would be a shorter wait, or may be able to reserve services for a future time.

Returning to FIG. 1, once a customer selects services to purchase and pays (180), the customer may receive a ticket (190) indicating those services by, for example, providing a list of services and/or a scannable code such as a bar code or a QR code. The customer then enters a car wash system (200), such as an automated car wash tunnel 320 (FIG. 2) by passing through a gate, for example, that triggers the activation of the car wash. In some embodiments, a ticket is only provided if a customer has ordered additional services. Otherwise, a customer may immediately enter the car wash tunnel 320 after paying (200).

Upon exiting the car wash tunnel 310, the customer may choose to leave the car wash (210) if they have not purchased additional services or if they had purchased services but reconsider based on the length of the queue. Alternatively the customer may enter a queue 330 for additional services (220), or purchase additional services (230). Some embodiments may not allow the purchase of additional services after entering the car wash tunnel 320, while others may charge a premium for purchasing at that point.

While customers are queued (240), they may exit their vehicles, leaving their vehicles 305 in the queue 330. The customers may need to re-enter their vehicles to advance within the queue, or the queue may contain a conveyer belt system for automating the advancement of the vehicles towards the service area. Alternatively, customer service representatives may manually advance the queued vehicles for the customers. Once customers and/or their vehicles 305 reach the service area 340, their tickets are taken and scanned (250) using a scanner 350. The information from the scanning of the ticket informs a computerized system that a ticket has been filled (260), which information can then be incorporated into the pricing calculations 115 and suggestions 130 provided by the system to new customers arriving.

Sometimes, customers may arrive at the service area 340 without a ticket. If a customer, for example, lost his or her ticket prior to arriving at the service area 340, a manager of the system or a car wash representative may be able to look up the customer (270) and their place in the queue in order to inform the system of the processing of the customer's ticket. In some embodiments, such a customer may be charged a premium for the service of looking up their ticket, or otherwise penalized by, for example, losing their place in a computerized queue. Such processing may be necessary for advancing the computerized queue, as well as for preventing a customer from purchasing a ticket and then handing it off to a separate customer to receive unpaid for services. Such processing also allows the system to maintain complete data related to the processing of tickets, the performance of individual crews, and other data recorded. In some embodiments, a customer may complete the queue without purchasing a ticket. In such event, the customer may be offered a service at a premium price to be purchased and provided upon entering the service area 340.

In the illustrated system, this logistical portion of the process is facilitated by providing the terminal 300 with a camera, electronic eye, or other sensor 310 to monitor incoming vehicles 305 and pair them with a listing of purchased services associated with their purchased ticket. The sensor 310 may be the same one that informs the system of the arrival of a new customer at the terminal prior to offering services (at 110). Alternatively the sensors or computer vision systems provided may be different. Employees working in the service area 340 may be provided with computerized terminals that are easy for them to access and use while working. These terminals may be, for example, waterproof and provided with touch screens so that employees can easily access information while working. An employee may then view the next few vehicles in the queue, select the current vehicle, and process the customer's ticket using the computerized terminal. In many cases, the customer arriving is expected to be the next customer in the queue.

In some embodiments, the system may assess the time between purchasing a ticket by a customer and the time at which the ticket is processed in order to, for example, assess the accuracy of the calculations being performed or improve the accuracy of future calculations. The data gathered by the system may be applied in varying ways. For example, real customer wait times can be used to inform predicted customer wait times. In some embodiments, variations between a predicted wait time and an actual wait time for a customer may be used to provide the customer with, for example, coupons for a future discounted service.

Where the service area contains multiple service stations and multiple queues, customers may be assigned to lanes based on the types of services they ordered, in order to maintain the order in which customers requested the services, or any premium services purchased. For example, a customer who paid a premium to skip the queue may be directed to a separate service station. Some specialized services may be offered only in specified service stations, and therefore customers who ordered those particular services may be assigned to an appropriate queue.

Further, because tickets are scanned and processed at each service station or by specific employees, the system can record statistics related to the processing of tickets. Crews can be assessed and commissioned based on efficiency, customer satisfaction, or other statistics that could be generated with the additional data.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. A system for providing vehicle wash services, the system comprising:
   a sensor configured to detect customers;
   a first computer terminal coupled to the sensor, the first computer terminal positioned prior to an automated carwash and configured to:

detect, via the sensor, a presence of a customer;
after detecting the customer via the sensor, provide, via a user interface accessible to the customer from the customer's vehicle, the customer with an option to purchase automated carwash services and additional services to be performed after the automated carwash services are completed,
receive an indication of selected services including at least one additional service to be performed after the automated carwash services,
determine queue length information for the selected services, wherein the queue length information for the selected services is based upon a number of workers available to perform the selected services, a time to perform the selected services, and a number of other customers currently waiting for the selected services,
determine pricing information for the selected services is based on the queue length information by comparing the queue length information to one or more thresholds and adjusting the pricing information for the selected services based on the comparison,
display queue length information and pricing information for the selected services,
store service information related to the selected services in a memory operably connected to the first computer terminal, and
dispense a ticket to the customer, wherein the ticket indicates the at least one addition service to be performed; and
a second computer terminal operably connected to the first computer terminal and comprising a scanning device configured to scan the ticket, the second computer terminal positioned after the automated carwash and configured to:
retrieve the service information related to the selected services from the memory,
display information to a user of the second computer terminal related to at least one additional service to be performed after the automated carwash services are completed, and
record in the memory that the ticket for the customer has been filled to incorporate the service information related to the selected services into queue length calculations and pricing calculations for use by the first computer terminal in determining queue length information and pricing information for subsequent customers.

2. The system of claim 1, wherein the sensor is configured to capture and store vehicle information in the memory when the vehicle is positioned adjacent to the first computer terminal.

3. The system of claim 2, wherein the sensor is a camera configured to capture and store an image of at least one of the customer or the vehicle.

4. The system of claim 3, wherein the second computer terminal is configured to display the image of at least one of the customer or the vehicle upon retrieving the service information from the memory.

5. The system of claim 4, wherein the second computer terminal is further configured to receive verification information verifying the service information and image prior to the customer receiving the at least one additional service.

6. The system of claim 1, wherein the first computer terminal is further configured to:

calculate a wait time for the at least one additional service based on the queue; and
display the wait time.

7. The system of claim 6, wherein the first computer terminal is further configured to adjust a price for the at least one additional service based on the wait time.

8. The system of claim 7, wherein the first computer terminal is further configured to discount the price for the at least one additional service if the wait time is below a predetermined level.

9. The system of claim 1, wherein the ticket comprises a list of purchased services and a scannable code.

10. The system of claim 1, wherein the at least one additional service further comprises at least one of an interior vacuum, interior window cleaning, an exterior hand wax, a tire shine, a bug removal, a towel dry, a carpet cleaning, or a carpet shampoo.

11. A system for providing vehicle wash services, the system comprising:
a sensor configured to detect customers;
a first computer terminal coupled to the sensor, the first computer terminal configured to:
detect, via the sensor, a presence of a customer;
after detecting the customer via the sensor, provide, via a user interface accessible to the customer from the customer's vehicle, the customer with an option to purchase automated carwash services and additional services to be performed after the automated carwash services are completed,
receive an indication of selected services including at least one additional service to be performed after the automated carwash services,
determine queue length information for the selected services, wherein the queue length information for the selected services is based upon a number of workers available to perform the selected services, a time to perform the selected services, and a number of other customers currently waiting for the selected services,
determine pricing information for the selected services is based on the queue length information by comparing the queue length information to one or more thresholds and adjusting the pricing information for the selected services based on the comparison,
display the queue length information and the pricing information for the selected services,
store service information related to the selected services in a memory operably connected to the first computer terminal, and
dispense a ticket to the customer, wherein the ticket indicates the at least one addition service to be performed;
an automated carwash tunnel positioned after and operably connected to the first computer terminal, the automated carwash tunnel configured to:
receive information related to purchased automated carwash services from the first computer terminal, and
provide the purchased automated carwash services to the vehicle associated with the customer; and
a second computer terminal operably connected to the first computer terminal and comprising a scanning device configured to scan the ticket, the second computer terminal positioned after the automated carwash tunnel and configured to:
retrieve the service information related to the selected services from the memory, display information to a user of the second computer terminal related to at least one additional service to be performed after the automated carwash services are completed, and record in the memory that the ticket for the customer has been filled to incorporate the service information related to the selected services into queue length calculations and pricing calculations for use by the first computer terminal in determining queue length information and pricing information for subsequent customers.

12. The system of claim 11, wherein the sensor is configured to capture and store vehicle information in the memory when the vehicle is positioned adjacent to the first computer terminal.

13. The system of claim 12, wherein the sensor is a camera configured to capture and store an image of the vehicle.

14. The system of claim 13, wherein the second computer terminal is configured to display the image of the vehicle upon retrieving the service information from the memory.

15. The system of claim 14, wherein the second computer terminal is further configured to receive verification information verifying the service information and image prior to the customer receiving the at least one additional service.

16. The system of claim 11, wherein the first computer terminal is further configured to:
    calculate a wait time for the at least one additional service based on the queue; and
    display the wait time.

17. The system of claim 16, wherein the first computer terminal is further configured to adjust a price for the at least one additional service based on the wait time.

18. The system of claim 17, wherein the first computer terminal is further configured to discount the price for the at least one additional service if the wait time is below a predetermined level.

19. The system of claim 11, wherein the ticket comprises a list of purchased services and a scannable code.

20. The system of claim 11, wherein the at least one additional service further comprises at least one of an interior vacuum, interior window cleaning, an exterior hand wax, a tire shine, a bug removal, a towel dry, a carpet cleaning, or a carpet shampoo.

* * * * *